J. H. RICHARDSON.
ENGINE.
APPLICATION FILED SEPT. 24, 1913.
1,090,650. Patented Mar. 17, 1914.
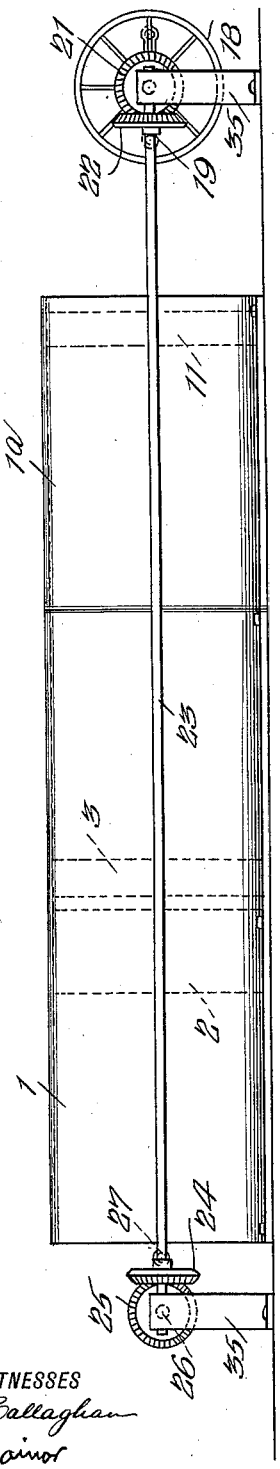
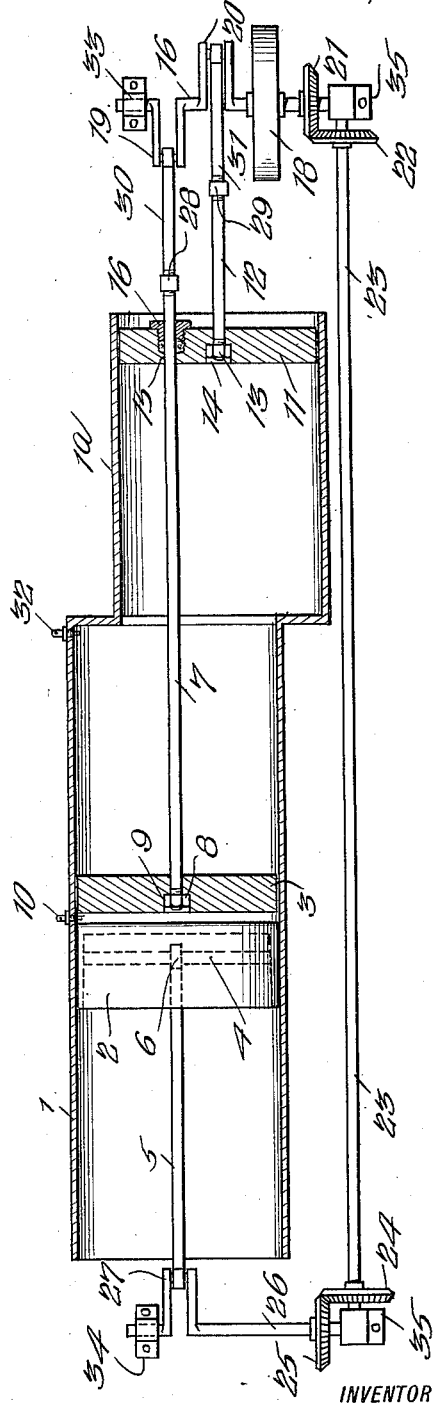
WITNESSES
E. H. Callaghan
C. E. Trainor
INVENTOR
John H. Richardson,
BY
Munn & Co.
ATTORNEYS

UNITED STATES PATENT OFFICE.

JOHN HARISON RICHARDSON, OF SHUBERT, NEBRASKA.

ENGINE.

1,090,650.  Specification of Letters Patent.  Patented Mar. 17, 1914.

Application filed September 24, 1913. Serial No. 791,533.

*To all whom it may concern:*

Be it known that I, JOHN H. RICHARDSON, a citizen of the United States, and a resident of Shubert, in the county of Richardson and State of Nebraska, have invented a new and useful Improvement in Engines, of which the following is a specification.

My invention is an improvement in engines, and has for its object to provide an engine for utilizing the expansive force of fluids, wherein a series of pistons is provided the central piston moving between the lateral pistons and in opposite direction to the said pistons, and coöperating in alternation with the said pistons as an abutment against which the motive fluid may react.

In the drawings: Figure 1 is a side view of the improved engine, and Fig. 2 is a longitudinal horizontal section of the engine.

The present embodiment of the invention comprises a cylinder consisting of two portions 1 and 1ª, offset laterally with respect to each other, but communicating at their meeting ends. Pistons 2 and 3 are arranged within the portion 1 of the cylinder, and the piston 2 is provided with a cross pin 4, to which is connected the inner end of a connecting or piston rod 5, the said rod having a bearing 6, which is journaled on the cross pin. The piston 3 is provided with a central opening through which is passed one end of a piston or connecting rod 7, and a nut 8 is threaded on to the rod on the opposite side of the piston from the body of the rod, the nut being received within a counterbored portion 9 of the piston. The piston 3 is a movable piston, moving from the position shown in Fig. 1 toward the portion 1ª of the cylinder, and the said piston acts as an abutment against which the motive fluid may react, and the said fluid is introduced between the pistons 2 and 3, in any suitable manner.

When an explosive compound is the motive fluid used, a suitable igniting device, as for instance, a spark plug 10, is arranged between the pistons 2 and 3. A piston 11 is arranged within the portion 1ª of the cylinder, and a piston or connecting rod 12 is connected with the said piston, the rod passing through a central opening in the piston.

A nut 13 is threaded on to the rod, on the inner side of the piston, the said nut being received in a recess 14 of the piston. The rod 7 passes through the piston 11, extending through an eccentric opening 15 in the said piston, and on the outer face of the piston, the opening is enlarged for engagement by a packing nut 16. The opposite ends of the cylinder 1—1ª are open as shown, and a crank shaft 17 is arranged transverse to the cylinder at the end adjacent to the portion 1ª. The said shaft is journaled in suitable bearings, and a fly wheel 18 is secured thereto intermediate the ends of the shaft. The shaft is provided with cranks 19 and 20, for connection with the pistons 3 and 11. At one end the said shaft is provided with a miter or bevel gear 21, which meshes with a similar gear 22, on a shaft 23, journaled parallel with the axis of the cylinder 1—1ª. At the opposite end of the cylinder, the shaft 23 is provided with a miter or bevel gear 24, which meshes with a similar gear 25, on a shaft 26, journaled parallel with the crank shaft at the opposite end of the cylinder and provided with a crank 27 for connection with the piston 2, by means of the rod 5. The rods 7 and 12 are connected with cross heads 28 and 29 respectively, the said heads moving in suitable guides, and connecting rods 30 and 31 connect the cross heads with the cranks 19 and 20 of the crank shaft. The piston 3 also acts as an abutment for coöperating with the piston 11, and when an explosive compound is the motive fluid, a suitable igniting device, as for instance, a spark plug 32 is arranged at the junction of the portions 1 and 1ª of the cylinder. The crank shaft 16 is journaled in bearings 33, and the shaft 26 is journaled in bearings 34, the said shafts being parallel as before stated, and being connected by means of the shaft 23, which is also journaled in suitable bearings 35.

The operation of the improved device is as follows: In the position of the parts shown in Fig. 1, a charge has been compressed between the piston 2 and the piston 3, and the said charge when ignited will drive the piston 2 outward in a manner to rotate the shaft 26. The piston 3 will also be moved toward the crank shaft 17, and through the rod 7 and the connecting rod 30, the movement of the piston will tend to rotate the crank shaft. It will be noticed that the crank shafts 19 and 20 are oppositely arranged and that the pistons 3 and 11 will move in opposite directions. When the piston 3 reaches the end of its travel toward the crank shaft the piston 11 will have reached the end of its travel toward the shaft 26, and as the said pistons are adjacent to each other, the charge which they have compressed between them will be ignited by the spark plug 32, thus tending to move the pistons in opposite directions. Since the crank shafts 16 and 26 are connected by the shaft 25 they will rotate together, and the power may be taken from any of the three shafts.

It will be evident from an inspection of Fig. 2, that the central and lateral pistons are connected together in such manner that the lateral pistons at all times move in the same direction and in the opposite direction to the central piston. It will be noted that the cranks 20 and 27 are arranged in the same manner, while the crank 19 is exactly opposite to the two said cranks.

The motive fluid may be of any character capable of expansion, as for instance, steam, or an explosive compound.

I claim:—

An engine comprising a cylinder consisting of portions offset laterally at their meeting ends and having their axes parallel, one of the said portions being of greater length than the other, pistons in the said longer portion and a piston in the shorter portion, a rod connected with the central piston, a rod connected with each of the lateral pistons and extending in opposite directions, the rod of the central piston passing through the piston in the smaller portion, a crank shaft at the outer end of each of the said portions, a connecting shaft arranged longitudinally of the cylinders and having a driving connection at each end with the adjacent crank shaft, the crank shafts having cranks for connection with the adjacent piston rods.

JOHN HARISON RICHARDSON.

Witnesses:
C. M. HEINZELMAN,
F. T. BOWERS.

Copies of this patent may be obtained for five cents each, by addressing the "Commissioner of Patents. Washington, D. C."